US010098122B2

(12) United States Patent
Wang et al.

(10) Patent No.: US 10,098,122 B2
(45) Date of Patent: Oct. 9, 2018

(54) SYSTEM AND METHOD FOR RESOURCE ALLOCATION FOR DEVICE-TO-DEVICE COMMUNICATIONS

(71) Applicant: Telefonaktiebolaget L M Ericsson (publ), Stockholm (SE)

(72) Inventors: Min Wang, Luleå (SE); Iana Siomina, Täby (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 136 days.

(21) Appl. No.: 14/710,165

(22) Filed: May 12, 2015

(65) Prior Publication Data

US 2015/0334714 A1 Nov. 19, 2015

Related U.S. Application Data

(60) Provisional application No. 61/993,651, filed on May 15, 2014.

(51) Int. Cl.
*H04L 12/835* (2013.01)
*H04W 72/04* (2009.01)

(52) U.S. Cl.
CPC ......... *H04W 72/0473* (2013.01); *H04L 47/30* (2013.01); *H04W 72/042* (2013.01)

(58) Field of Classification Search
CPC .. H04L 47/30; H04W 72/042; H04W 72/0473
See application file for complete search history.

(56) References Cited

U.S. PATENT DOCUMENTS 8,797,968 B2 * 8/2014 Bertrand ........... H04W 72/0406
370/203
2010/0322086 A1 12/2010 Harris et al.
(Continued)

FOREIGN PATENT DOCUMENTS

WO WO 2013/157906 A1 10/2013

OTHER PUBLICATIONS

ROC (Taiwan), Office Action of the Intellectual Property Office, Taiwan Office Action and Search Report, Patent Application No. 104115650, communication dated Jun. 23, 2016, foreign and English versions, 7 pages.
(Continued)

*Primary Examiner* — Asad Nawaz
*Assistant Examiner* — Zhaohui Yang
(74) *Attorney, Agent, or Firm* — Baker Botts, LLP

(57) ABSTRACT

In one example embodiment, a method for allocating resources for device-to-device communications in a wireless communications network includes receiving signaling, by a first wireless device, of a transmission schedule. The transmission schedule includes first transmission opportunities for scheduling requests allocated to a first link and second transmission opportunities for scheduling requests allocated to a second link. Signaling is received from a network node. The signaling carries the information of a grant allocation for at least one buffer status report message. The information may include a first number of buffer status report messages to be transmitted for the first link and a second number of buffer status report messages to be transmitted for the second link after a transmission of a scheduling request for the first link.

24 Claims, 12 Drawing Sheets

(56) References Cited

U.S. PATENT DOCUMENTS

2011/0199991 A1* 8/2011 Harris ............... H04W 72/1263
370/329
2012/0269154 A1 10/2012 Wang et al.
2013/0322413 A1 12/2013 Pelletier et al.
2015/0071212 A1* 3/2015 Kim ................... H04W 72/042
370/329

OTHER PUBLICATIONS

3GPP TSG RAN WG1 Meeting #76bis; Shenzen, P.R. China; Source: Samsung; Title: Mode 1 resource allocation for D2D broadcast communication (R1-141307), Mar. 31-Apr. 4, 2014.
3GPP TSG-RAN WG2 #85; Prague, Czech Republic; Source: Ericsson; Title: Resource allocation for D2D transmitters in coverage (Tdoc R2-140625), Feb. 10-14, 2014.
3GPP TSG RAN WG2 Meeting #85bis; Valencia, Spain; Source: CATT; Title: D2D Communication Resource Allocation Mode 1 (R2-141195), Mar. 31-Apr. 4, 2014.
3GPP TSG RAN WG1 Meeting #77; Seoul, Korea; Source: CATT; Title: on mode 1 resource allocation for broadcast communication (R1-142004), May 19-23, 2014.
3GPP TSG RAN WG2 Meeting #86; Seoul, Korea; Source: Huawei, HiSilicon; Title: Discussion on SR for D2D communication (R2-142231), May 19-23, 2014.
PCT Notification of Transmittal of the International Search Report and the Written Opinion of the International Searching Authority, or the Declaration for International application No. PCT/IB2015/053606, dated Jul. 27, 2015.

* cited by examiner

SYSTEM AND METHOD FOR RESOURCE ALLOCATION FOR DEVICE-TO-DEVICE COMMUNICATIONS

RELATED APPLICATION

This application claims benefit under 35 U.S.C. § 119(e) to U.S. Provisional Application Ser. No. 61/993,651, entitled "Resource Allocation for Device-to-Device Communications," filed May 15, 2014, the entire content of which is incorporated herein by reference.

TECHNICAL FIELD

This disclosure pertains to a network system and method and more particularly to a system and method for resource allocation for device-to-device (D2D) communications.

BACKGROUND

Cellular data is typically communicated between devices via a network and one or more base stations. In general, the base station includes functionality for ensuring that the radio resource is used as efficiently as possible. For example, a radio base station may schedule device transmissions based on some suitable metric.

In some instances, however, devices may be configured for the transmission and receipt of direct communications with one another. For example, if a base station is not working properly, the devices may operate to communicate directly without the assistance of the radio base station. Such direct communication between devices may be referred to as device to device communication (or D2D communication). In 3GPP network, specifically, D2D communication may be called Proximity Services (ProSe). ProSe includes services that can be provided by the 3GPP system based on wireless devices being proximate to each other. Architectures and reference models are described in TS 23.303.

The resources used for supporting D2D communications may overlap with the resources used for supporting cellular traffic. Specifically, the D2D layer may use cellular uplink (UL) and/or downlink (DL) resources for the transmission of D2D data. For example, the resources used by the D2D layer may include physical resource blocks (PRB) that are used for the control of the D2D traffic by the cellular network node, such as an LTE eNB, the PRBs used by the D2D traffic, and the PRBs used for neighbor (peer) discovery by a D2D-capable user equipment (UE).

Investigations have shown that to meet the coverage requirements, each D2D transport block should be transmitted four times. The transmission procedure for D2D may typically follow the procedure for legacy transmissions. For example, a wireless device may first send a scheduling request (SR) to the eNB or other network node to indicate a need for resources. The wireless device may also send a buffer status report (BSR) with information on, among other things, the amount of data of different logical channels. In response, the network node can grant resources to the wireless device. The granting of the resources may be based upon considerations such as system load, traffic priority order, wireless device connection quality indications, the information included in the BSR and SR, and any other suitable information.

For D2D specifically, the wireless device may transmit a D2D-BSR on the PUSCH. The purpose of the D2D-BSR is to inform the network node about the amount of data the wireless device has on logical channels related to D2D. Although this makes it possible to reuse the existing BSR, it requires at least one logical channel group for D2D communication. If the wireless device is also configured with legacy LTE bearers and D2D discovery, the four existing logical channel groups may become a restriction.

The network node may set up periodic BSRs related to the validity time of the D2D grant for increased efficiency. The D2D grant may be transmitted on the PDCCH similar to legacy PUSCH grants. The purpose of the grant is to allow the wireless device to transmit data on the ProSe or other physical channel. The grant also allows the network node to control which wireless device gets to transmit at any given time and on what resources. Thus, the grant reduces communication interference and the possibility for collisions.

Before a wireless device can transmit the Scheduling Assignment (SA), the wireless device must receive a valid grant. For example the SA cycle can be 160 ms. In each cycle there may be up to four occasions for transmission of the SA. So, in short, every 40 ms there may be an opportunity to send an SA. As such, a wireless device may send an SA in one 40 ms opportunity of a given cycle and listen for other SAs during the other 120 ms of the same cycle. This means that a wireless device can send and receive D2D transmissions continuously if the data transmission patterns are orthogonal.

The sending of a SR may be triggered when the wireless device buffer includes data queued either for the cellular link or the D2D link. The existing scheme of scheduling requests follows a fixed transmission cycle assigned by the network and carries only 1 bit of information. Hence, when the wireless device sends a 1 bit SR, the network node cannot identify whether the request applies to a cellular link or a D2D link. As a result, the network node may not be able to schedule the wireless device in the appropriate priority order and assign the suitable resources accordingly.

Similarly, the network node may not be able to identify the BSR that follows the scheduling request as applying to the D2D link or the cellular link. As such, the network node may not understand whether the received buffer status information is used to convey the status for a cellular transmission or a D2D transmission.

SUMMARY

In a particular example implementation, a method for allocating resources for device-to-device communications in a wireless communications network includes receiving signaling, by a first wireless device, of a transmission schedule. The transmission schedule includes first transmission opportunities for scheduling requests allocated to a first link and second transmission opportunities for scheduling requests allocated to a second link. Signaling is received from a network node. The signaling carries the information of a grant allocation for at least one buffer status report message. The information may include a first number of buffer status report messages to be transmitted for the first link and a second number of buffer status report messages to be transmitted for the second link after a transmission of a scheduling request for the first link.

In another particular example implementation, a wireless device for providing IP address translation services may include a memory storing instructions and one or more processors in communication with the memory. The one or more processors execute the instructions to cause the processor to receive signaling of a transmission schedule that includes a first plurality of transmission opportunities allocated to a first link and a second plurality of transmission opportunities allocated to a second link. The one or more processors may receive signaling from a network node that carries the information of a grant allocation for at least one buffer status report message. The information may include a first number of buffer status report messages to be transmitted for the first link and a second number of buffer status report messages to be transmitted for a second link after a transmission of scheduling request for the first link.

In still another particular example implementation, a method for allocating resources for device-to-device communications in a wireless communications network includes transmitting signaling, by a network node, of a transmission schedule. The transmission schedule may include a first plurality of transmission opportunities for scheduling requests allocated to a first link and a second plurality of transmission opportunities for scheduling requests allocated to a second link. Signaling may be transmitted by the network node to a first wireless device. The signaling may carry the information of a grant allocation for at least one buffer status report message. The information may include a first number of buffer status report messages to be transmitted for the first link and a second number of buffer status report messages to be transmitted for the second link after a transmission of the scheduling request for the first link.

In yet another particular example implementation, a network node for providing IP address translation services includes a memory storing instructions and one or more processors in communication with the memory. The one or more processors may operate to execute the instructions to cause the one or more processors to transmit signaling of a transmission schedule. The transmission schedule may include a first plurality of transmission opportunities for scheduling requests allocated to a first link and a second plurality of transmission opportunities for scheduling requests allocated to a second link. Signaling may be transmitted to a first wireless device (110A). The signaling may carry the information of a grant allocation for at least one buffer status report message. The information may include a first number of buffer status report messages to be transmitted for the first link after a transmission of a scheduling request for the first link and a second number of buffer status report messages to be transmitted for the second link after a transmission of the scheduling request for the first link.

Some embodiments of the disclosure may provide one or more technical advantages. For example, certain embodiments may enable resource allocation for wireless devices that include priority queues for both cellular transmissions and D2D transmissions. One advantage may be that a network node may schedule transmission opportunities to the wireless device. Specifically, the network node may divide the transmission opportunities between cellular transmissions and D2D transmissions. As a result, an SR received from a wireless device during a transmission opportunity allocated for D2D communication may indicate to the network node that the wireless device has a preference to execute the data transmission via a D2D link. Likewise, a buffer status report (BSR) that is transmitted during a D2D transmission opportunity may be recognized by the network node as including the buffer status of priority queues for D2D data. As a result, the network node may be able to differentiate between the D2D SR and an "non-D2D" SR. Such differentiation may help improve scheduling when a wireless device has both D2D traffic and cellular uplink traffic for transmission.

Another technical advantage may be that other uplink resources (both control channel elements (CCEs) and data channel PRBs) assigned by the network node may also be split in a time domain and/or the frequency domain. The assignment may be performed in a static way. Alternatively, the assignment may change dynamically based on the system resource utilization efficiency. Some UL control channel resources (i.e., CCEs and others) may be reused for the purpose of the D2D link transmission. Additionally or alternatively, the downlink resources may be used for the D2D link transmission if there is little data transmission in the downlink.

Some embodiments may benefit from some, none, or all of these advantages. Other technical advantages may be readily ascertained by one of ordinary skills in the art.

DETAILED DESCRIPTION

Particular embodiments are described in FIGS. 1-12 of the drawings, like numerals being used for like and corresponding parts of the various drawings.

Figure 1:
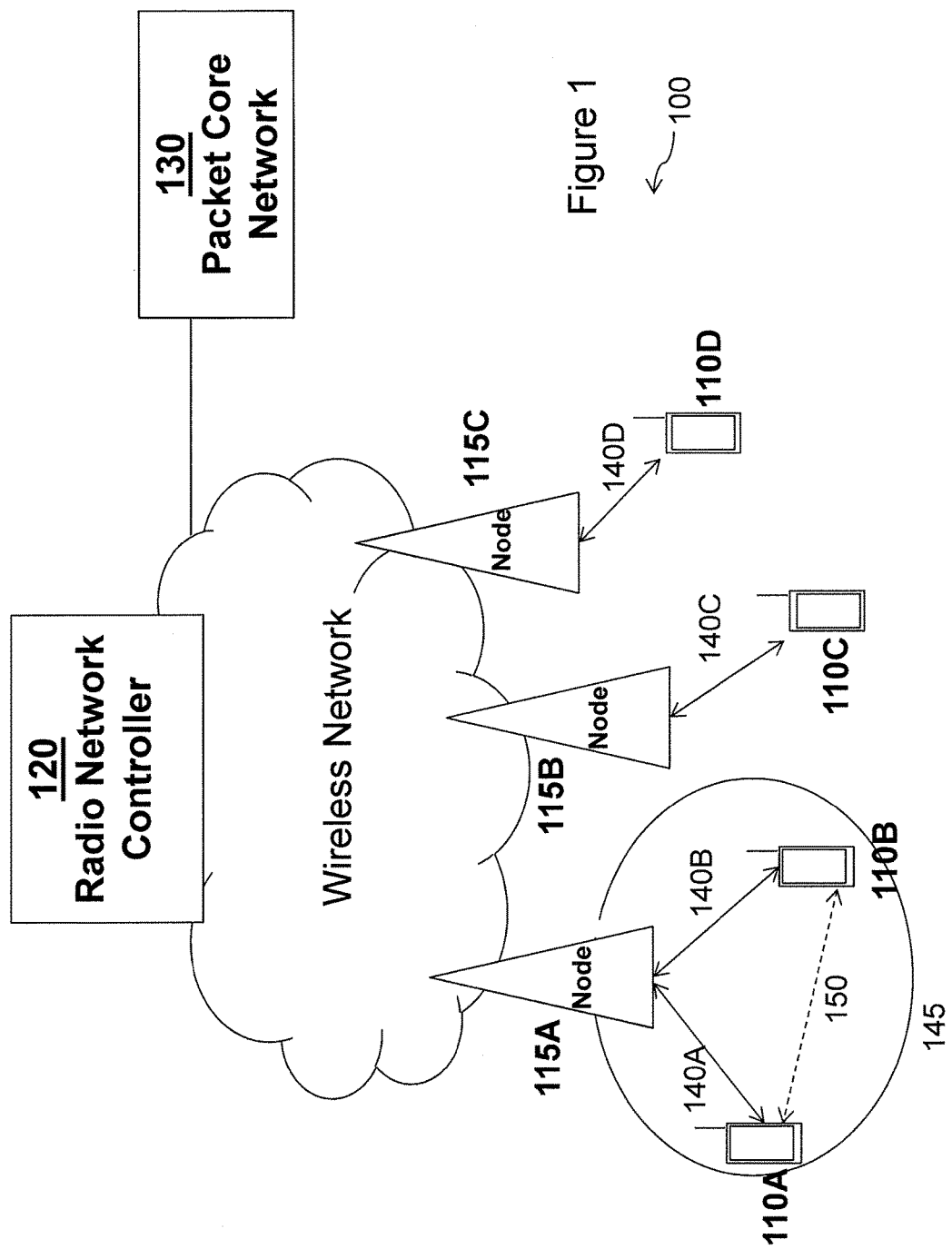
FIG. 1 is a block diagram illustrating an exemplary network, according to a particular embodiment.

A wireless network may be used for the transmission of both cellular and device to device (D2D) communications. FIG. 1 is a block diagram illustrating an exemplary wireless network 100 that includes one or more wireless devices 110A-D, network nodes 115A-C, radio network controller 120, and packet core network node 130. Wireless devices 110A-D may communicate with network nodes 115A-C over a wireless interface. For example, wireless devices 110A and 110B may transmit wireless signals to network node 115A and/or receive wireless signals from network node 115A. The wireless signals may contain voice traffic, data traffic, control signals, and/or any other suitable information and may be transmitted via cellular links 140A-

140B. Likewise, wireless devices 110C and 110D may transmit wireless signals to and receive wireless signals from network nodes 115B and 115C via cellular links 140C and 140D, respectively.

Radio network nodes 115A-C may interface with radio network controller 120. The radio network nodes 115A-C and the radio network controller 120 are comprised in a radio access network, RAN. Radio network controller 120 may control radio network node 115A-C and may provide certain radio resource management functions, mobility management functions, and/or other suitable functions. Radio network controller 120 may interface with packet core network node 130. In certain embodiments, radio network controller 120 may interface with packet core network node 130 via an interconnecting network. The interconnecting network may refer to any interconnecting system capable of transmitting audio, video, signals, data, messages, or any combination of the preceding. The interconnecting network may include all or a portion of a public switched telephone network, PSTN; a public or private data network; a local area network, LAN; a metropolitan area network, MAN; a wide area network, WAN; a local, regional, or global communication or computer network such as the Internet; a wireline or wireless network; an enterprise intranet; or any other suitable communication link, including combinations thereof.

In some radio access technologies, RATs, such as in LTE networks, the functions of the radio network controller 120 are comprised in the radio network nodes 115A-C. In some embodiments, packet core network node 130 may manage the establishment of communication sessions and various other functionality for wireless devices 110A-D. For example, wireless devices 110A-D, radio network nodes 115A-C, and packet core network node 130 may use any suitable radio access technology, such as long term evolution, LTE; LTE-Advanced; Universal Mode Telecommunications System, UMTS; High Speed Packet Access, HSPA; Global System for Mobile Communications, GSM; code division multiple access 2000, CDMA2000; Worldwide Interoperability for Microwave Access, WiMax; WiFi; another suitable radio access technology; or any suitable combination of one or more of these or other radio access technologies. In particular embodiments, a wireless device 110A-D may exchange certain signals with packet core network node 130 using the non-access stratum layer. In non-access stratum signaling, signals between wireless device 110A-D and packet core network node 130 may be transparently passed through the radio access network.

As described herein, embodiments of network 100 may include one or more wireless devices 110A-D, and one or more different types of network nodes capable of communicating (directly or indirectly) with wireless devices 110A-D. Examples of the network nodes include network nodes 115A-C, radio network controller 120, and packet core network node 130. However, network 100 may include any additional elements suitable to support communication between wireless devices 110A-D or between a wireless device 110A-D and another communication device (such as a landline telephone). Each wireless device 110A-D, radio network node 115A-C, radio network controller 120, and packet core network node 130 may include any suitable combination of hardware and/or software. Examples of particular embodiments of radio network nodes 115A-B, network nodes (such as radio network controller 120 and packet core network 130), and wireless device 110A-D are described with respect to FIGS. 6, 8, and 10, respectively.

As depicted, network node 115A serves a cell 145 and may in some embodiments be part of the radio access network. In particular exemplary embodiments, network node 115A may be an eNB, eNodeB, or a Home Node B, a Home eNode B, or any other network device capable to serve user equipment or a machine type communication device in a wireless communications network 100.

A first wireless device 110A and second wireless device 110B are located within the cell 145. First wireless device 110A is configured to communicate within the cellular communications network 100 via the radio base station 115A over a radio link 140A when the first wireless device 110A is present in the cell 145 served by network node 115A. Similarly, second wireless device 110B is configured to communicate within the cellular communications network 100 via the radio base station 115A over a radio link 140B when second wireless device 110B is present in cell 145 served by network node 115A.

Additionally, first wireless device 110A and second wireless device 110B have capabilities for communicating with each other over a direct device to device (D2D) link 150. A direct device to device connection means that communications (including the transmission and reception of signals and the encoding and decoding of information) are performed without passing through network node 115A or any other intermediate node. D2D link 150 may also be referred to as a peer to peer connection. For communicating with each other, a first IP address may be assigned to the first wireless device 110A while a second IP address may be assigned to second wireless device 110B. Communications between wireless devices 110A and 110B may use D2D link 150 when wireless devices 110A and 110B are proximate to one another. D2D communication provides an underlay to the cellular network to increase spectral efficiency and improving network performance. The wireless signals transmitted via D2D link 150 may contain voice traffic, data traffic, control signals, and/or any other suitable information.

In operation, a wireless device 110A-B may choose between cellular link 140A-B and D2D link 150 when establishing a communication session. For example, wireless device 110A-B may choose the link based on the amount of data stored in a buffer of the wireless device 110A-B, a measured link quality, and/or a priority order that may consider both cellular priority queues and the D2D priority queues. After choosing between cellular link 140A-B and D2D link 150, wireless device 110A-B transmits a scheduling request and BSR to network node 115A to request resource assignment and initiate the communication session. In a particular embodiment, the BSR may include the selected priority queues. Network node 115A may determine and decide the resource assignment upon the reception of the scheduling request and BSR report. The network node 115A may also take into account knowledge of the system and quality of one or any combination of cellular links 140A-B and D2D 150.

In certain embodiments, network node 115A may be able to determine a preference of wireless device 110A-B between D2D link 150 and cellular link 140A. Specifically, network node 115A may identify the preference of wireless device 110A-B based on the SR and BSR received from wireless device 110A. For example, the SR resource division between cellular and D2D queues may be implemented in the time domain. In other words, the SR transmission opportunities may be split in the time domain such that specific or periodic positions within a transmission schedule may be allocated to cellular link 140A and D2D link 150 separately. Just as with the origin of the current SR scheme of LTE, whether it is D2D link 150 or cellular link 140A, depends on when in time the D-SR is used.

Figure 2:
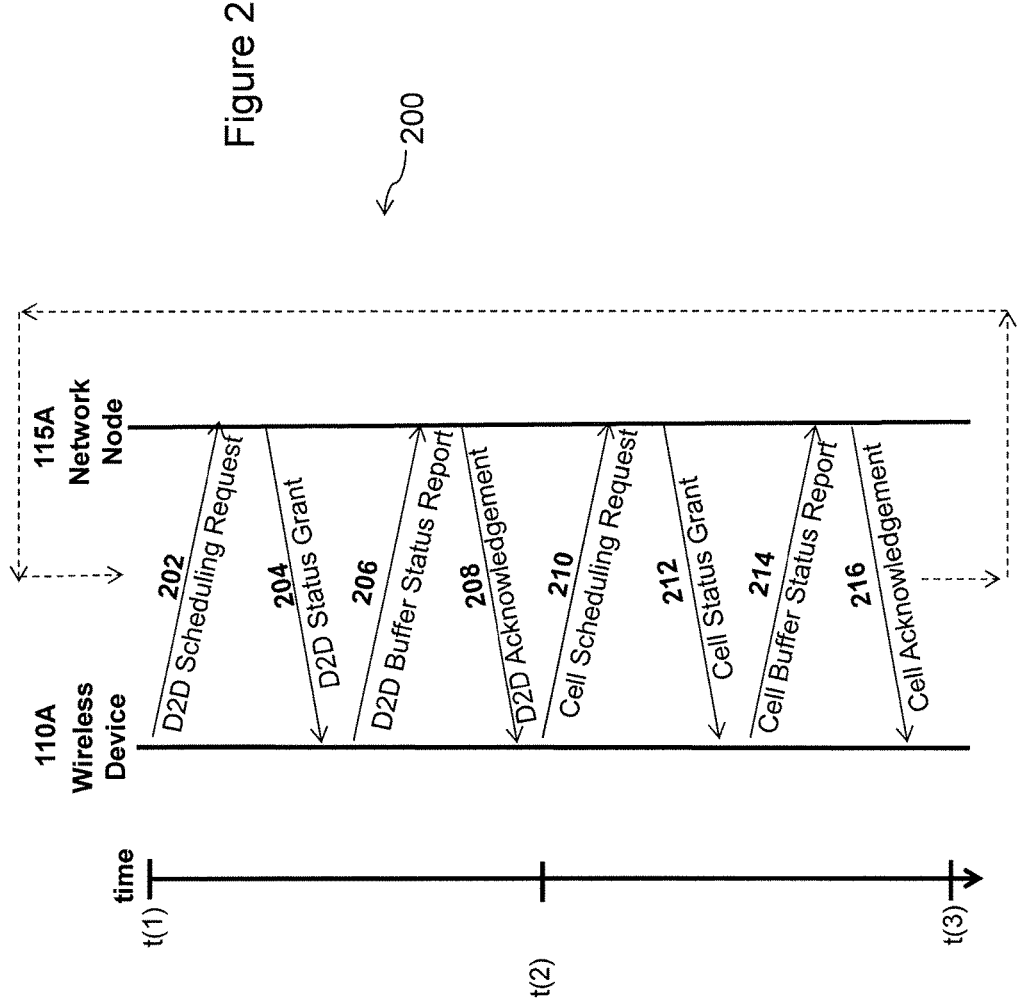
FIG. 2 is a swim-lane diagram illustrating a transmission schedule for splitting D2D and cellular scheduling requests, according to a particular embodiment.

FIG. 2 is a swim-lane diagram illustrating an exemplary transmission schedule 200 for splitting D2D and cellular scheduling requests, according to certain embodiments. As depicted, wireless device 110A may be assigned D-SR opportunities with a fixed and repeated periodicity.

For example, the transmission schedule 200 may allocate t(1) to a transmission opportunity for the transmission of D2D scheduling requests. Accordingly, at t(1), wireless device 110A may send D2D scheduling request 202. Because network node 115A knows that t(1) is allocated to a D2D scheduling request, network node 115A may be able to determine, when it receives D2D scheduling request 202, that wireless device 110A has a preference for sending a D2D transmission via D2D link 150. Thereafter, and within the time period between t(1) and t(2), network node 115A may send a D2D buffer status grant 204 that identifies that wireless device 110A may send a D2D buffer status report within the predetermined time interval. Stated differently, D2D buffer status grant 204 may be valid for one BSR transmission with certain periodicity. Accordingly, as granted, wireless device 110A may send the D2D buffer status report 206 and receive a D2D acknowledgement 208.

Conversely, the transmission schedule 200 may allocate t(2) to a transmission opportunity for the transmission of cellular scheduling requests. Accordingly, at t(2), wireless device 110A may send cellular scheduling request 210. Because network node 115A knows that t(2) is allocated to a cellular scheduling request, network node 115A may be able to determine, when it receives cellular scheduling request 210, that wireless device 110A has a preference for sending a cellular transmission on cellular link 140A. Thereafter, and within the time period between t(2) and t(3), network node 115A may send a cellular buffer status grant 212 that identifies that wireless device 110A may send a cellular buffer status report within the predetermined time interval. Thus, the cellular status grant 212 may be valid for one BSR transmission. Accordingly, as granted, wireless device 110A may send the cellular buffer status report 214 and receive a D2D acknowledgement 216 during the predetermined time interval between t(2) and t(3).

In this manner, wireless device 110A transmits a SR at each position after each interval if wireless device 110A has available data for transmission and not enough resources assigned yet. One may also recognize from transmission schedule 200 that every odd D-SR transmission opportunity may indicate that a request belonging to the cellular link 140A is available in the buffer, while every even SR transmission opportunity may indicate that a request belonging to D2D link 150 is available in the buffer. In a particular embodiment, the start of the counting of the SR transmission opportunities can be initiated whenever wireless device 110A is switched to RRC connected mode and synchronized to the network 100. Alternatively, the counter can be reset when wireless device 110A reestablishes the RRC connection or re-attains the connection after being out of sync.

Figure 3:
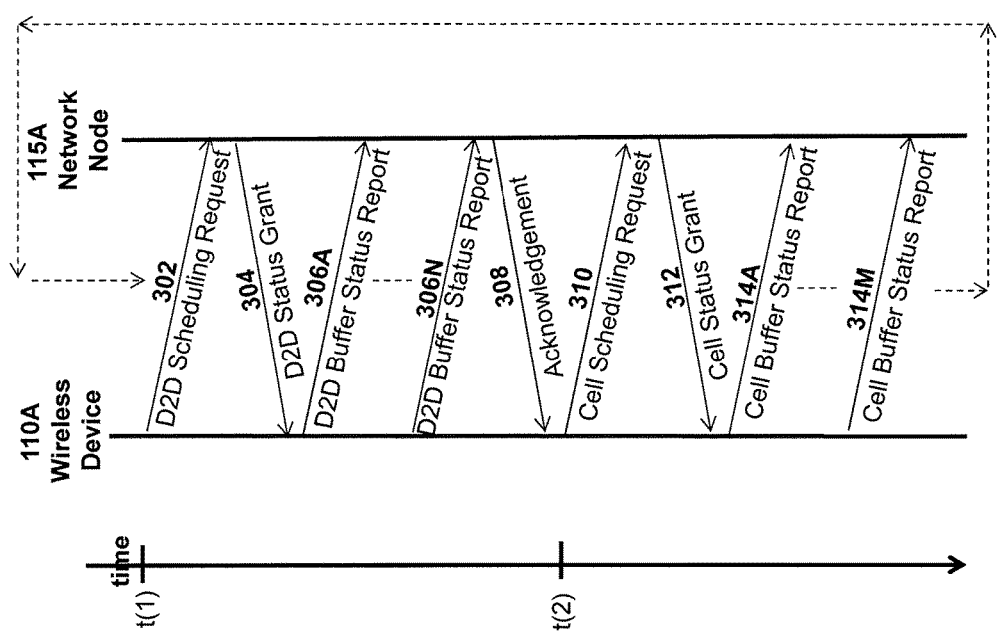
FIG. 3 is a swim-lane diagram illustrating an alternative transmission schedule for splitting D2D and cellular scheduling requests, according to a particular embodiment.

In another embodiment, instead of using an equal D-SR split of the transmission opportunities between cellular link 140A and the D2D link 150, the split may be made according to the portion of D2D data that is transmitted during a given time frame relative to the total transmitted data during the same given time frame. FIG. 3 is a swim-lane diagram illustrating an alternative transmission schedule 300 for splitting D2D and cellular scheduling requests according to load. Specifically, whereas each time interval of transmission schedule 200 provided for a single D2D buffer status report or cellular buffer status report, transmission schedule 300 provides for n-number of D2D buffer status reports or m-number of cellular buffer status reports. In a particular embodiment, m and n may be equal such that each grant is valid for an equal number of D2D buffer status reports or cellular buffer status reports. Alternatively, in a particular embodiment, the n-number of D2D buffer status reports and m-number of cellular buffer status reports may be unequal and varied based on prior communications transmitted by wireless device 110A.

In the depicted example, transmission schedule 300 allocates t(1) to a transmission opportunity for the transmission of D2D scheduling requests. Accordingly, at t(1), wireless device 110A may send D2D scheduling request 302. Because network node 115A knows that t(1) is allocated to a D2D scheduling request, network node 115A may be able to determine, when it receives D2D scheduling request 302, that wireless device 110A has a preference for sending a D2D transmission on D2D link 150. Thereafter, and within the time period between t(1) and t(2), network node 115A may send a D2D status grant 304 that identifies n-number of D2D buffer status reports that wireless device 110A may send within the predetermined time interval. Thus, D2D status grant 304 may be valid for one or more BSR transmissions (e.g., n>=1 BSRs with certain periodicity). Accordingly, wireless device 110A may send n-number of D2D buffer status reports 306A-N and receive a D2D acknowledgement 308.

Conversely, the transmission schedule 300 may allocate t(2) to a transmission opportunity for the transmission of cellular scheduling requests. Accordingly, at t(2), wireless device 110A may send cellular scheduling request 310. Because network node 115A knows that t(2) is allocated to a cellular scheduling request, network node 115A may be able to determine, when it receives cellular scheduling request 310, that wireless device 110A has a preference for sending a cellular transmission on cellular link 140A. Thereafter, and within the time period between t(2) and t(3), network node 115A may send a cellular status grant 312 that identifies a m-number of buffer status reports that wireless device 110A may send within the predetermined time interval. Thus, cellular status grant 312 may be valid for one or more BSR transmissions (e.g., m>=1 BSRs with certain periodicity). Accordingly, wireless device 110A may send m-number of cellular buffer status reports 314A-M and receive a D2D acknowledgement 316 during the predetermined time interval between t(2) and t(3).

In this manner, if wireless device 110A has executed more transmissions over D2D link 150 recently, more SR transmission opportunities may be assigned for D2D link 150. For example, in a particular embodiment, two out of three opportunities may be assigned to D2D link 150. One third of the SR opportunities may then be assigned to cellular communications on cellular link 140A. The allocation of SR opportunities may be performed in a dynamic manner that varies over time, depending on load requirements over time.

Various modifications and variations may be made to transmission schedule 300. For example, it may be recognized that the splitting of transmission opportunities may be valid when wireless device 110A has uplink synchronization. However, if wireless device 110A loses uplink synchronization, the configuration of the split may be reset by remote radio controller reconfiguration when wireless device 110A reestablishes the radio link. For example, if wireless device 110A has no uplink PUCCH resource allocation, transmission schedule 300 may be reconfigured and a new n-number and m-number of SR transmission opportunities may be determined.

In certain embodiments, the configuration of transmission schedule 300 may be wireless device controlled or network controlled. In certain embodiments, the configuration of transmission schedule 300 may be selected based on knowledge of the network, specific rules, or historic statistics for the network or wireless device 110A. For example, wireless device transmission activities such as the volume of transmitted data and the relative portions of transmissions made over D2D link 150 and cellular link 140A may form the basis of the configuration of transmission schedule 300. In a particular embodiment, wireless device 110A may provide the transmission data and historic data to the network node 115A. The selected transmission schedule configuration may then be set by network node 115A and provided to wireless device 110A via RRC signaling, which may be by dedicated signaling or broadcast signaling.

Figure 4:
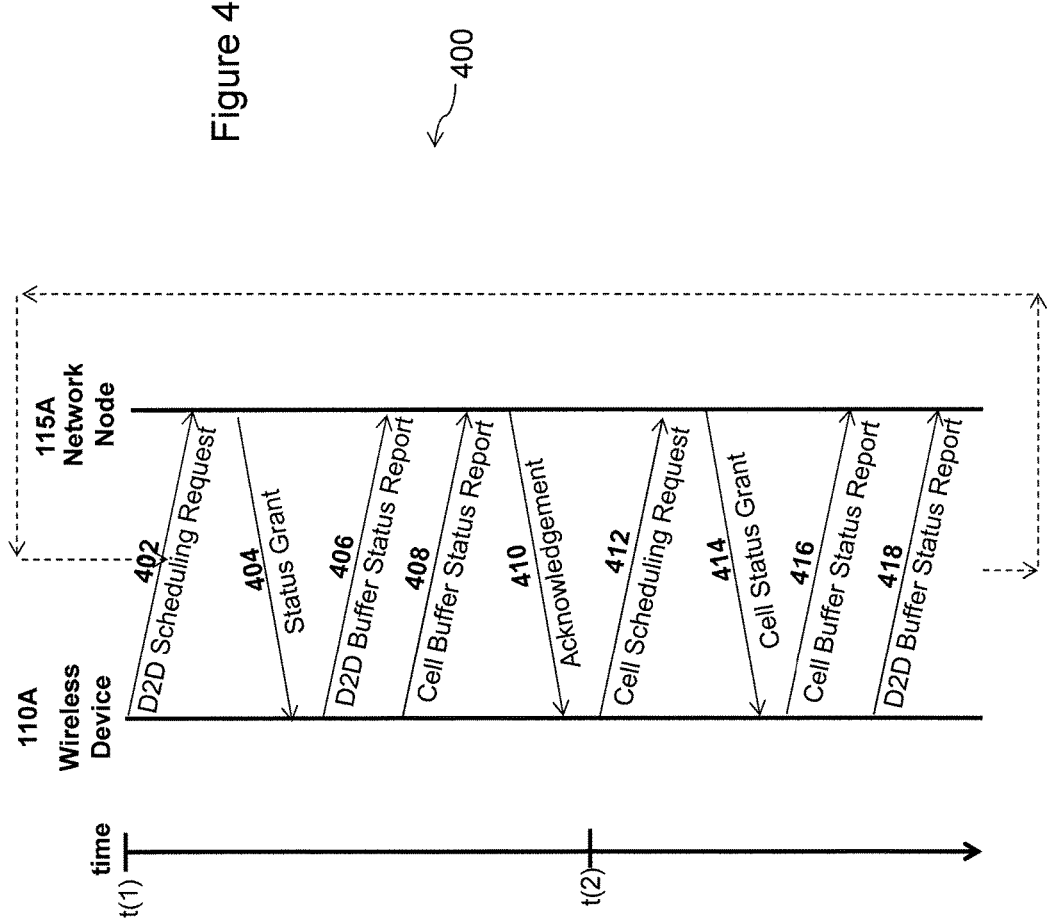
FIG. 4 is a swim-lane diagram illustrating another alternative transmission schedule for splitting D2D and cellular scheduling requests, according to a particular embodiment.

FIG. 4 is a swim-lane diagram illustrating another alternative transmission schedule 400 for splitting D2D and cellular scheduling requests, according to a particular embodiment. As depicted in transmission schedule 400, the grant assigned for a BSR is valid for a single D2D BSR and a single cellular BSR. This is true whether the SR was received during a time interval allocated to a D2D SR transmission or a time interval allocated to a cellular SR transmission.

In the depicted example, transmission schedule 400 allocates t(1) to a transmission opportunity for the transmission of D2D scheduling requests. Accordingly, at t(1), wireless device 110A may send D2D scheduling request 402. Because network node 115A knows that t(1) is allocated to a D2D scheduling request, network node 115A may be able to determine, when it receives D2D scheduling request 402, that wireless device 110A has a preference for sending a D2D transmission on D2D link 150. Thereafter, and within the time period between t(1) and t(2), network node 115A may send a D2D status grant 404 that identifies that wireless device 110A may send a D2D buffer status report 406 and a cellular buffer status report 408 within the predetermined time interval. Thus, D2D status grant 404 may be valid for a single BSR D2D transmission and a single BSR cellular transmission. In response to D2D buffer status report 406 and cellular buffer status report 408, wireless device 110A may receive acknowledgment 410 from network node 115A.

Conversely, transmission schedule 400 allocates t(2) to a transmission opportunity for the transmission of cellular scheduling requests. Accordingly, at t(2), wireless device 110A may send cellular scheduling request 412. Because network node 115A knows that t(2) is allocated to a cellular scheduling request, network node 115A may be able to determine, when it receives cellular scheduling request 412, that wireless device 110A has a preference for sending a cellular transmission on cellular link 140A. Thereafter, and within the time period between t(2) and t(3), network node 115A may send a cellular status grant 414 that identifies that wireless device 110A may send a cell buffer status report 416 and a D2D buffer status report 418 within the predetermined time interval. Thus, cellular status grant 414 may be valid for a single BSR cellular transmission and a single BSR D2D transmission. In response to cellular buffer status report 416 and D2D buffer status report 418, wireless device 110A may receive acknowledgment 420 from network node 115A.

In the depicted example, wireless device 110A the order for reporting the cellular and D2D BSRs is determined based on the type of SR transmitted. For example, a D2D buffer status report 406 is transmitted before cellular buffer status report 408 after the granting of D2D SR 402. Conversely, a cellular buffer status report 416 is transmitted before D2D buffer status report 418 after the granting of cellular SR 412. However, the reporting order of the respective BSRs may be altered such that cellular BSRs are always transmitted prior to D2D BSRs. Alternatively, D2D BSRs may be always transmitted prior to cellular BSRs. The depicted and described examples are provided for example purposes only and may be altered by network node 115A or wireless device 110A as appropriate.

Figure 5:
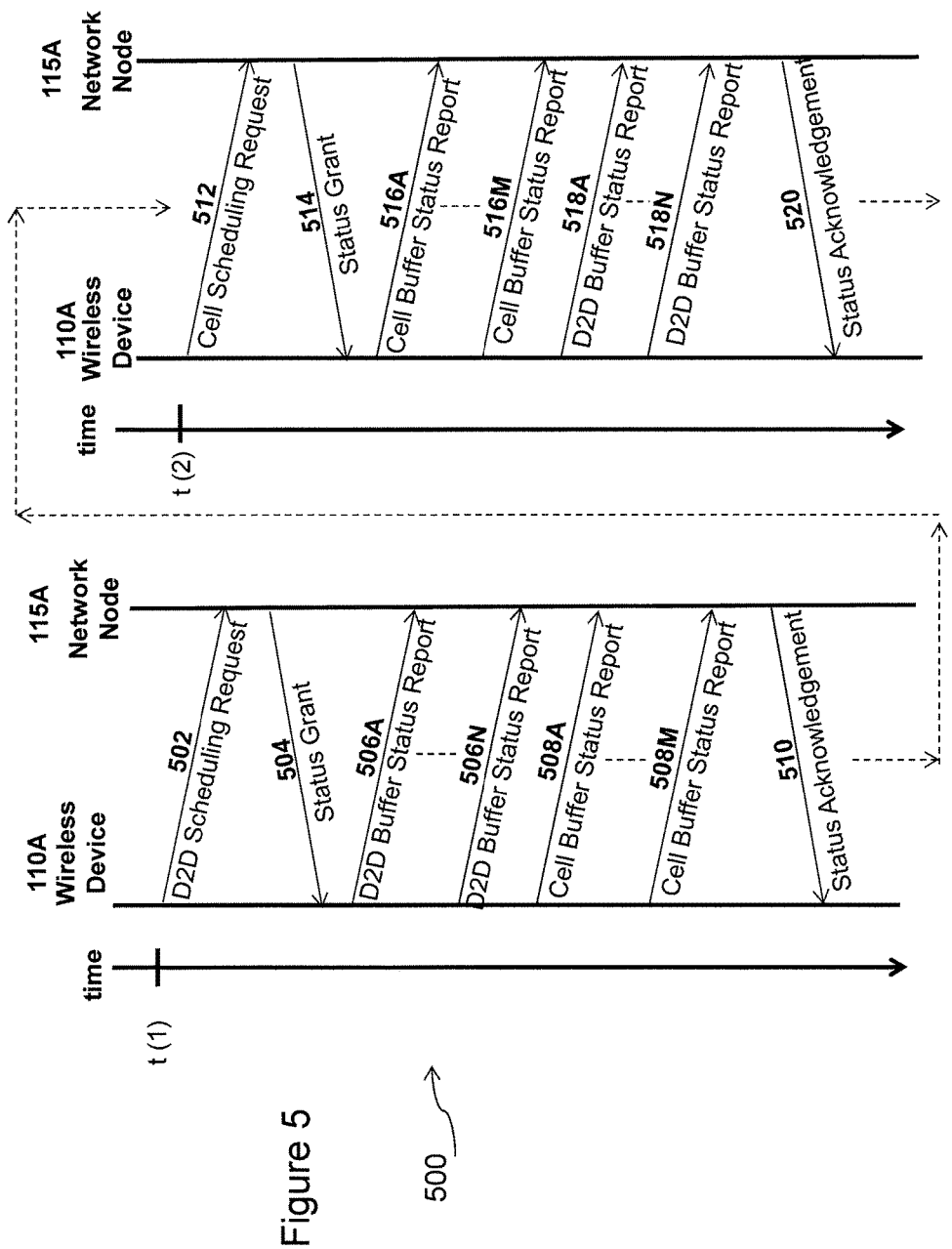
FIG. 5 is a swim-lane diagram illustrating still another alternative transmission schedule for splitting D2D and cellular scheduling requests, according to a particular embodiment.

FIG. 5 is a swim-lane diagram illustrating still another alternative transmission schedule 500 for splitting D2D and cellular scheduling requests, according to a particular embodiment. As depicted in transmission schedule 500, the grant assigned for a BSR is valid for n+m BSR transmissions. This is true whether the SR was received during a time interval allocated to a D2D SR transmission or a time interval allocated to a cellular SR transmission.

In the depicted example, transmission schedule 500 allocates t(1) to a transmission opportunity for the transmission of D2D scheduling requests. Accordingly, at t(1), wireless device 110A may send D2D scheduling request 502. Because network node 115A knows that t(1) is allocated to a D2D scheduling request, network node 115A may be able to determine, when it receives D2D scheduling request 502, that wireless device 110A has a preference for sending a D2D transmission on D2D link 150. Thereafter, and within the time period between t(1) and t(2), network node 115A may send a D2D status grant 504 that identifies n-number of D2D buffer status reports and m-number of cellular buffer status reports that wireless device 110A may send within the predetermined time interval. Thus, D2D status grant 504 may be valid for one or more D2D BSR transmissions (e.g., n>=1 D2D BSRs with certain periodicity) and one or more cellular BSR transmissions (e.g., m>=1 cellular BSRs with certain periodicity). Accordingly, wireless device 110A may send n-number of D2D buffer status reports 506A-N and m-number of cellular buffer status reports 508A-M. Thereafter, wireless device 110A may receive an acknowledgement 510.

Conversely, transmission schedule 400 allocates t(2) to a transmission opportunity for the transmission of cellular scheduling requests. Accordingly, at t(2), wireless device 110A may send cellular scheduling request 512. Because network node 115A knows that t(2) is allocated to a cellular scheduling request, network node 115A may be able to determine, when it receives cellular scheduling request 512, that wireless device 110A has a preference for sending a cellular transmission on cellular link 140A. Accordingly, and within the time period between t(2) and t(3), network node 115A may send a cellular status grant 514 that identifies m-number of cellular buffer status reports and n-number of D2D buffer status reports that wireless device 110A may send within the predetermined time interval. Thus, cellular status grant 514 may be valid for one or more cellular BSR transmissions (e.g., m>=1 cellular BSRs with certain periodicity) and one or more D2D BSR transmissions (e.g., n>=1 data BSRs with certain periodicity). Accordingly, wireless device 110A may send m-number of cellular buffer status reports 516A-M and n-number of D2D buffer status reports 518A-N. Thereafter, wireless device 110A may receive an acknowledgement 520.

In the depicted example, the order for reporting the cellular and D2D BSRs is determined based on the type of SR transmitted by wireless device 110A. Thus, the order for reporting the cellular and D2D BSRs is determined in accordance with the preference indicated by wireless device 110A. For example, a D2D buffer status report 406 is transmitted before cellular buffer status report 408 after the granting of D2D SR 402. Conversely, a cellular buffer status report 416 is transmitted before D2D buffer status report 418 after the granting of cellular SR 412. However, it is again noted that the reporting order of the respective BSRs may be altered such that cellular BSRs are always transmitted prior to D2D BSRs or vice versa. The depicted and described examples are provided for example purposes only and may be altered by network node 115A or wireless device 110A as appropriate.

Though a number of transmission schedules are depicted in FIGS. 2-5, it is generally recognized that the transmission schedules are provided for example purposes only. A number of modifications or variations may be made to the transmissions schedules.

In a more general example, the BSR grant sent by the network may be valid for only one subsequent BSR transmission after the successful transmission of scheduling request. The further subsequent BSR transmissions can use the padding bits of the MAC protocol data unit (PDU). In other words, there may be enough free bits in the grant assigned for the data transmission to carry at least a BSR. In such case, BSR(s) may be contained in the MAC control elements of the MAC PDU using the padding bits. The same rules that have been proposed in above embodiments can be also applied here. As in FIG. 3, for example, the D2D buffer status report 306A may be transmitted using the D2D buffer status grant 304, while the other N-1 D2D buffer status reports 306B-N may be transmitted using the padding bits in the subsequent transmitted MAC PDUs. The same rule may be applicable to the cellular buffer status reports 314B-M.

A similar rule may also applicable the embodiments illustrated in FIG. 4 and FIG. 5 if the BSR grant sent by the network is valid for only one subsequent BSR transmission after the successful transmission of scheduling request. With regard to FIG. 4, for example, the D2D buffer status report 406 may be transmitted using the D2D buffer status grant 404, while cell buffer status report 408 may be transmitted using the padding bits in the subsequent transmitted MAC PDUs. Likewise, cell buffer status report 416 may be transmitted using the cell buffer status grant 414, while the D2D buffer status report 418 may be transmitted using the padding bits in the subsequent transmitted MAC PDUs. With regard to FIG. 5, D2D buffer status report 506A may be transmitted using the D2D buffer status grant 504, while the other N-1 D2D buffer status reports 306B-N and M cell status reports 508A-M may be transmitted using the padding bits in the subsequent transmitted MAC PDUs. Likewise, cell buffer status report 516A may be transmitted using the cell buffer status grant 514, while the other cell buffer status reports 516A-M and N D2D status reports 518A-N may be transmitted using the padding bits in the subsequent transmitted MAC PDUs.

As still another modification, it may be recognized that both downlink and uplink resources can be split between the D2D link and the cellular link. Thus, either or both of the control channel CCEs and the data channel PRBs may be split between the D2D link and the cellular link.

Additionally, though the transmissions schedules described above depict the split of resources in the time domain, resources may be additionally or alternatively split in the frequency domain. Where split in the frequency domain, wireless device 110A-D may simultaneously support parallel transmissions over the cellular link and the D2D link.

In certain embodiments, the total assigned resources for wireless device 110A-D may be decided by the scheduler considering the scheduling policy and the data volume of other wireless devices 110A-D in the system. The scheduler may be blind to the portion of the D2D data among the total available data for wireless device 110A-D. In certain embodiments, wireless device 110A-D may split the resources between the cellular link and D2D link by itself. In other embodiments, network node 115A may have full knowledge of the data volume and the priority order for the cellular priority queues and D2D priority queues separately. Hence, a scheduler of network node 115A may schedule the cellular queues from all wireless devices 110A-D and D2D queues from all wireless devices 110A-D separately.

Another example modification may be that the resources can be wholly occupied by the cellular link 140A and D2D link 150 for certain time periods. The time periods could be in the unit of transmission time intervals (TTIs) or seconds depend on the data volume and the priority orders. The resources assignment for D2D link 150 and the cellular link 140A may be repeated periodically or varied in the varying time units.

Some region of the control channel resources (CCEs) which are allocated for use by a cellular link transmission could be reused for a D2D link transmission. For example, a PUCCH message has several different formats. The PUCCH format designed for the MIMO transmission can be reused for the D2D link 150 transmission if there is no MIMO transmission mode configured in the cellular link 140A. The PUCCH format designed for DL HARQ acknowledgement may be reused if there is no downlink data transmission scheduled at the same time.

In still another example embodiment, downlink resources may be used for the uplink D2D transmission if there is no down link transmission for the wireless device 110A-D scheduled. Hence, the cellular link uplink transmission, and D2D link transmission can be launched in parallel occupying the different resources. The resources may also be equally or divided in N:M fashion where the relation N:M reflects the division between the data volume of cellular and D2D queues.

In yet another embodiment, the D2D SR/BSR may also be per carrier frequency. For example, when there is already an on-going D2D communication on a carrier, it may not make sense to have one wireless device 110A-D sending D2D traffic on carrier 1 and another wireless device 110A-D responding to the first wireless device 110A on carrier 2. Additionally, a wireless device 110A-D may have a carrier frequency preference.

In certain embodiments, network node 115A-C may determine that an SR is for D2D link 150 based on an explicit indication that the SR is a D2D SR or based on which resources the SR is sent on. For example, network node 115A-C may determine that an SR is a request for resources for a cellular SR or for a D2D SR where the resources may be pre-defined or configurable. As another example, network node 115A-C may determine that an SR is a request for resources for a cellular link or a D2D link based on pre-defined rules. For example, sending SR on a D2D-dedicated carrier would imply that the SR is always for D2D. Alternatively, every Kth report may be for D2D and the other reports are for cellular.

Upon the identification of the SR for which link and the reception of the corresponding BSR report, network node 115A-C may follow the wireless devices 110A-D preference and assign the resources for the requested transmission. Alternatively, network node 115A-C may make a different allocation by ordering the wireless device 110A-D to transmit data on the other link instead of the requested link if resource utilization by the system may be more efficient under the circumstances.

Figure 6:
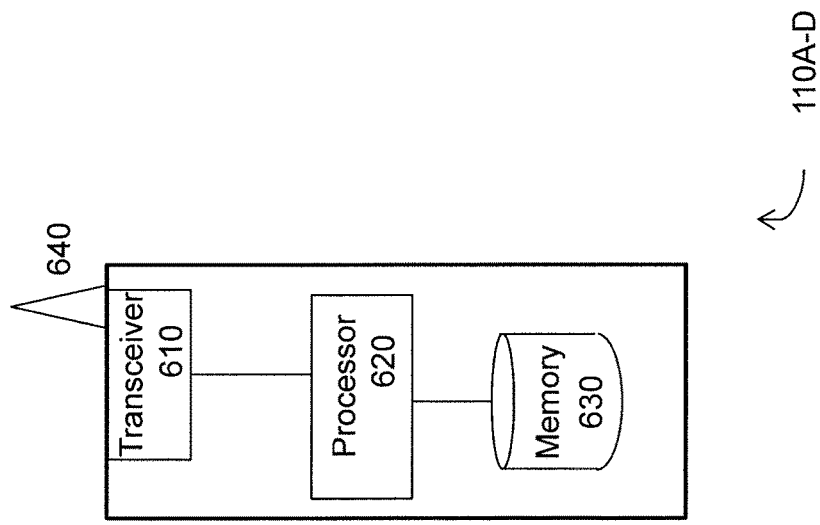
FIG. 6 is a block diagram illustrating an exemplary wireless device, according to a particular embodiment.

FIG. 6 is a block diagram illustrating certain embodiments of a wireless device 110A-D. Example wireless device 110A-D includes a mobile phone, a smart phone, a PDA (Personal Digital Assistant), a portable computer (e.g., laptop, tablet), a personal computer, a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 600 may also be referred to as user equipment (UE), a station (STA), a device, or a terminal in some embodiments.

In the depicted embodiment, wireless device 600 includes transceiver 610, processor 620, and memory 630. In some embodiments, transceiver 610 facilitates transmitting signals to and receiving signals from network devices such as network nodes 115A-C. Transceiver 610 may include, although not shown, a transmitter and a receiver. Thus, in some instances, transceiver circuit includes a transceiver to perform functions of both a transmitter and a receiver. For example, a transmitter may convert baseband signals from processor 620 to RF signals, and a receiver may convert RF signals to baseband signals. Transceiver 503 connects to antenna 502 for transmission and/or reception of the RF signals.

Processor 620 executes instructions to provide some or all of the functionality described herein as being provided by wireless devices 110A-D, and memory 630 stores the instructions executed by processor 620.

Antenna 640 includes one or more antennas to transmit and/or receive radio frequency (RF) signals over the air interface. Antenna 640 may, for example, receive RF signals from transceiver 610 and transmit the RF signals over the air interface to network nodes, such as network nodes 115A-C. Additionally, antenna 640 may receive RF signals over the air interface from network nodes 115A-C and provide the RF signals to transceiver 610.

Processor 620 may include any suitable combination of hardware and software implemented in one or more modules to execute instructions and manipulate data to perform some or all of the described functions of wireless devices 110A-D. In some embodiments, processor 620 may include, for example, one or more computers, one or more central processing units (CPUs), one or more microprocessors, one or more applications, one or more application specific integrated circuits (ASICs), one or more field programmable gate arrays (FPGAs), and/or other logic. Processor 620 may control the operations of wireless device 110A-D and its components.

Memory 630 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 620.

Other embodiments of wireless device 110A-D may include additional components beyond those shown in FIG. 6 that may be responsible for providing certain aspects of the wireless device's functionality, including any of the functionality described above and/or any additional functionality (including any functionality necessary to support the solution described above). As just one example, wireless device 110A-D may include input devices and circuits, output devices, and one or more synchronization units or circuits, which may be part of the processor 620. Input devices include mechanisms for entry of data into wireless device 110A-D. For example, input devices may include input mechanisms, such as a microphone, input elements, a display, etc. Output devices may include mechanisms for outputting data in audio, video and/or hard copy format. For example, output devices may include a speaker, a display, etc.

The terminology wireless device includes, but should not be limited to, user equipment, a mobile station, a fixed or mobile subscriber unit, a pager, a cellular telephone, a personal digital assistant (PDA), a computer, or any other type of user device capable of operating in a wireless communication.

Figure 7:
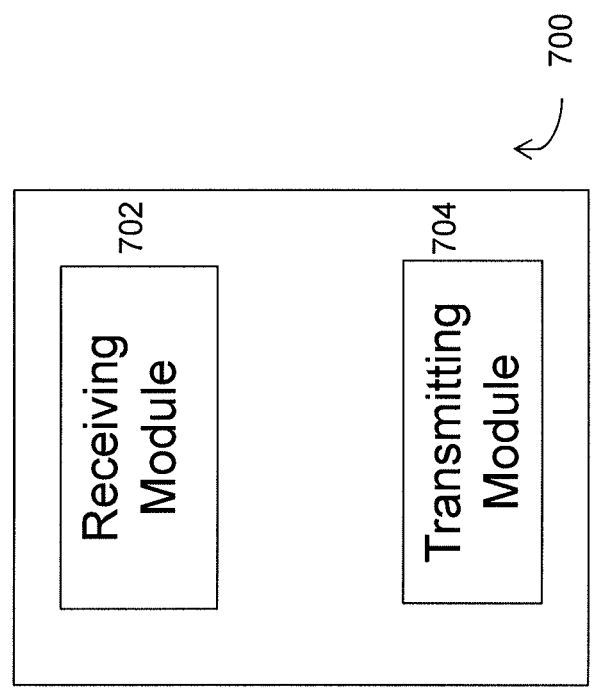
FIG. 7 is a block diagram illustrating a computer networking virtual apparatus, according to a particular embodiment.

In certain embodiments, wireless device 110A-D may operate as a computer networking virtual apparatus. FIG. 7 is a block diagram illustrating a computer networking virtual apparatus 700. As depicted, the virtual apparatus 700 includes at least one receiving module 702 and at least one transmitting module 704. The receiving module 702 may perform the receiving functions of wireless device 110A-D, as described herein. For example, receiving module may receive signaling of a transmission schedule from network node 115A. In a particular embodiment, the transmission schedule may include a first plurality of transmission opportunities for scheduling requests allocated to a first link and a second plurality of transmission opportunities for scheduling requests allocated to a second link. The at least one receiving module 702 may also receive signaling from network node 115A that includes information of a grant allocation for at least one buffer status report message. As described above, the grant allocation may include a first number of buffer status report messages to be transmitted for a first link and a second number of buffer status report messages to be transmitted for a second link.

Transmitting module 704 may perform the transmitting functions of virtual apparatus 700, as described herein. For example, transmitting module 704 may transmit a scheduling request for the first link to network node 115A during a transmission opportunity of the first plurality of transmission opportunities. In a particular embodiment, the first plurality of transmission opportunities may be allocated for D2D scheduling requests.

Figure 8:
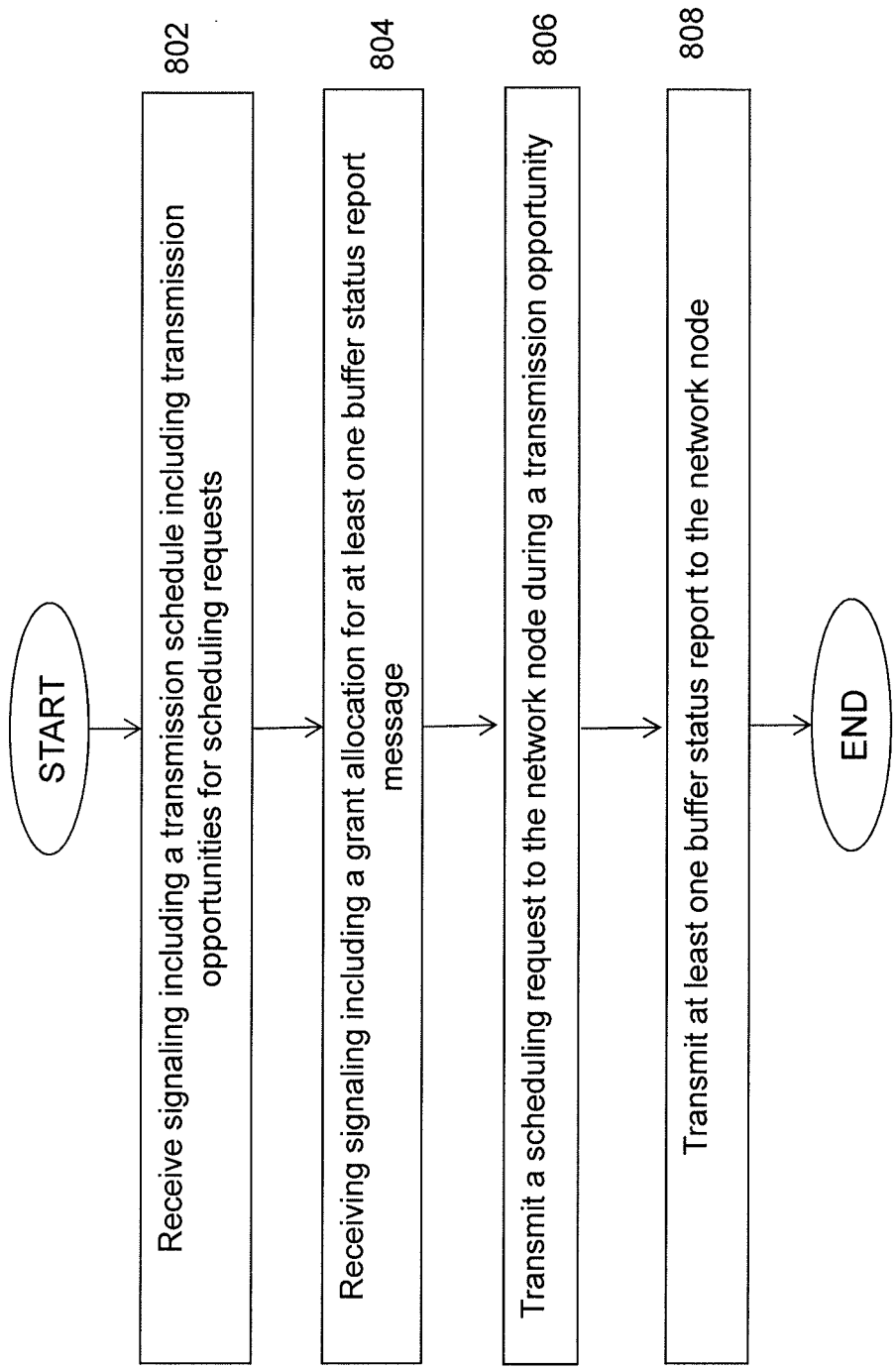
FIG. 8 is as flow chart illustrating an exemplary method of splitting D2D and cellular scheduling requests by a wireless device, according to a particular embodiment.

FIG. 8 is as flow chart illustrating an exemplary method of splitting D2D and cellular scheduling requests by a wireless device, according to a particular embodiment.

The method begins at step 802 with receipt of signaling including a transmission schedule. In certain embodiments, the transmission schedule may include a first plurality of transmission opportunities for scheduling requests allocated to a first link. The transmission schedule may also include a second plurality of transmission opportunities for scheduling requests allocated to a second link. In a particular embodiment, for example, the first link may include a D2D link 150 between a first wireless device 110A and a second wireless device 110B. The second link may be a cellular link 140A between the first wireless device 110A and network node 115A.

At step 804, the wireless device 110A receives signaling including a grant allocation for at least one buffer status report message. In a particular embodiment, the grant allocation may include information that includes a first number of buffer status report messages to be transmitted for the first link after a transmission of a scheduling request for the first link. The grant allocation may also include a second number of buffer status report messages to be transmitted for the second link after a transmission of a scheduling request for the first link.

At step 806, wireless device 110A may send a scheduling request to network node 115A during a transmission opportunity. In a particular embodiment, the transmission opportunity may include a selected one of the transmission opportunities with the first plurality of transmission opportunities. For example, the transmission opportunity might include a transmission opportunity allocated to D2D scheduling requests. Alternatively, the transmission opportunity might include a transmission opportunity allocated to cellular scheduling requests. Receipt of the scheduling request during a transmission opportunity allocated to a D2D scheduling requests may indicate to the network node 115A that wireless device 110A-D has a preference for sending a D2D communication. Likewise, receipt of the scheduling request during a transmission opportunity allocated to a cellular scheduling requests may indicate to the network node 115A that wireless device 110A-D has a preference for sending a cellular communication.

At step 808, wireless device 110A may send at least one buffer status report to network node 115A. Where, for example, the grant allocation is valid for a first number of buffer status report messages to be transmitted on the first link and a second number of buffer status report messages to be transmitted on the second link, wireless device 110A may send as many as but no more the first number of buffer status report messages and the second number of buffer status report messages.

Figure 9:
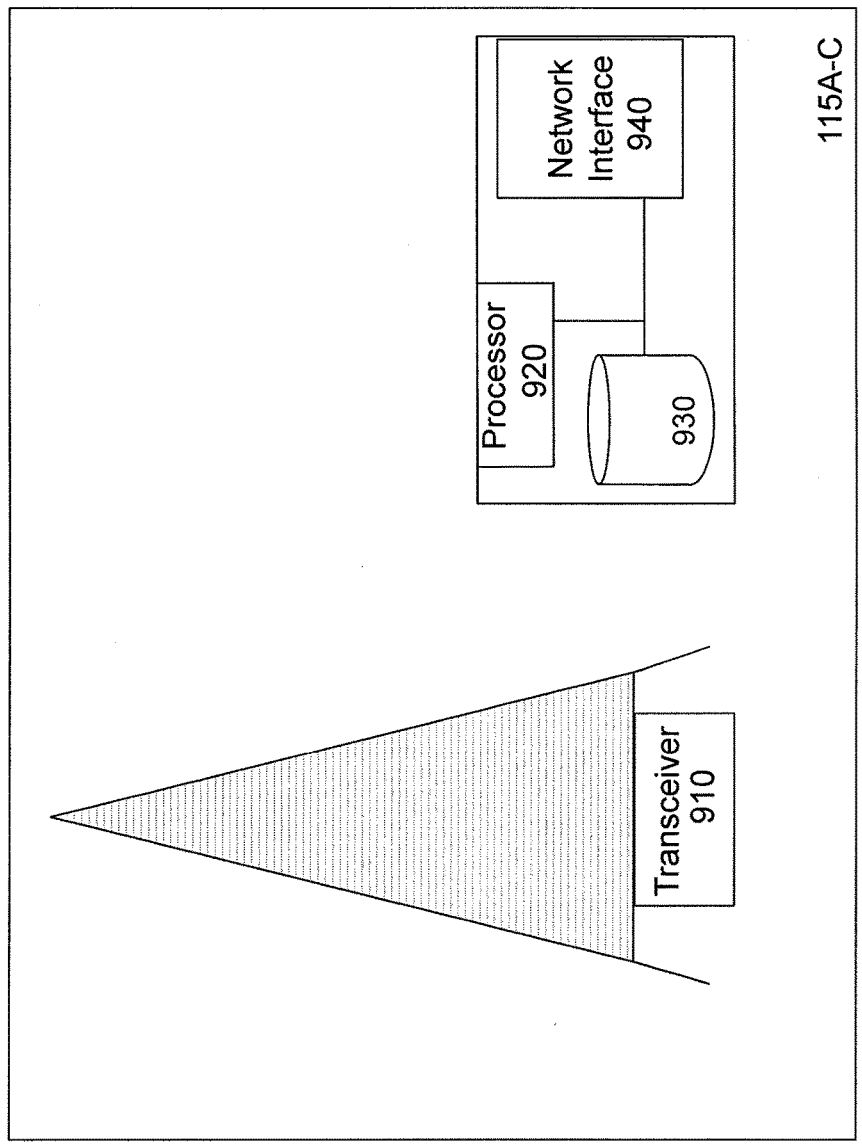
FIG. 9 is a block diagram illustrating an exemplary network node, according to a particular embodiment.

FIG. 9 is a block diagram illustrating embodiments of network node 115A-C. In certain embodiments, network node 115A-C includes a radio access node, such as an eNodeB, a node B, a base station, a wireless access point (e.g., a Wi-Fi access point), a low power node, a base transceiver station (BTS), transmission points, transmission nodes, remote RF unit (RRU), remote radio head (RRH), a relay node, a UE acting as a relay node, or another suitable radio access node.

Network nodes 115A-C are deployed throughout network 100 as a homogenous deployment, heterogeneous deployment, or mixed deployment. A homogeneous deployment generally describes a deployment made up of the same (or similar) type of radio access nodes and/or similar coverage and cell sizes and inter-site distances. A heterogeneous deployment generally describes deployments using a variety of types of radio access nodes having different cell sizes, transmit powers, capacities, and inter-site distances. For example, a heterogeneous deployment may include a plurality of low-power nodes placed throughout a macro-cell layout. Mixed deployments include a mix of homogenous portions and heterogeneous portions.

As depicted, network nodes 115A-C includes one or more of transceiver 910, processor 920, memory 930, and network interface 940. Transceiver 910 facilitates transmitting wireless signals to and receiving wireless signals from wireless communication device 110A-D (e.g., via an antenna), processor 920 executes instructions to provide some or all of the functionality described above as being provided by a network node 115A-C, memory 930 stores the instructions executed by processor 920, and network interface 940 communicates signals to backend network components, such as a gateway, switch, router, Internet, Public Switched Telephone Network (PSTN), other network nodes, core network nodes 130, etc.

Processor 920 includes any suitable combination of hardware and software implemented in one or more modules to execute instructions and manipulate data to perform some or all of the described functions of network node 115A-C. In some embodiments, processor 920 includes, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and refers to any suitable device operable to receive input for radio network node 115A-C, send output from radio network node 115A-C, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

Other embodiments of network node 115A-C include additional components (beyond those shown in FIG. 9) responsible for providing certain aspects of the radio network node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 10:
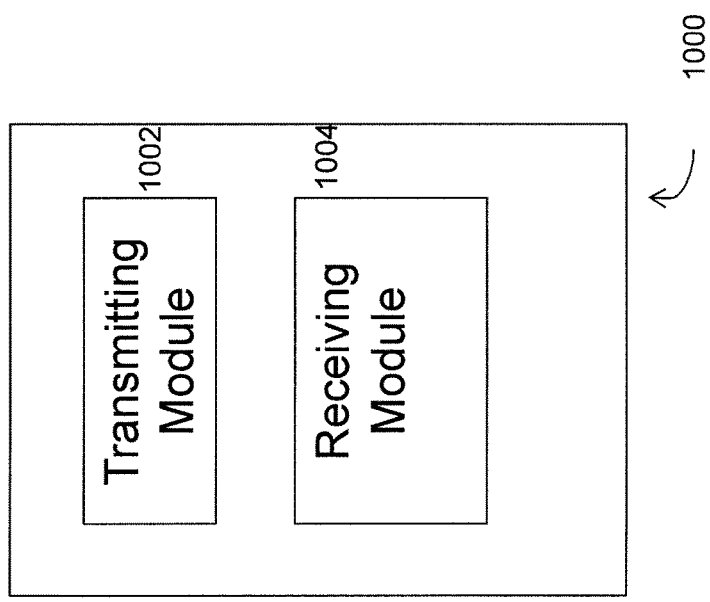
FIG. 10 is a block diagram illustrating a computer networking virtual apparatus, according to a particular embodiment.

FIG. 10 is a block diagram illustrating a computer networking virtual apparatus, according to a particular embodiment. As depicted, the virtual apparatus 1000 includes at least one transmitting module 1002 and at least one receiving module 1004. The transmitting module 1002 may perform the transmitting functions of wireless device network node 115A-C, as described herein. For example, transmitting module 1002 may transmit signaling of a transmission schedule to wireless device 110A. In a particular embodiment, the transmission schedule may include a first plurality of transmission opportunities for scheduling requests allocated to a first link and a second plurality of transmission opportunities for scheduling requests allocated to a second link. The at least one transmitting module 1002 may also transmit signaling to wireless device 110A-D that includes information of a grant allocation for at least one buffer status report message. As described above, the grant allocation may include a first number of buffer status report messages to be transmitted by wireless device 110A-D for a first link 150 and a second number of buffer status report messages to be transmitted by wireless device 110A-D for a second link 140A.

Receiving module 1004 may perform the receiving functions of virtual apparatus 1000, as described herein. For example, receiving module 1004 may receive a scheduling request for the first link from wireless device 110A-D during a transmission opportunity of the first plurality of transmission opportunities. In a particular embodiment, the first plurality of transmission opportunities may be allocated for D2D scheduling requests.

Figure 11:
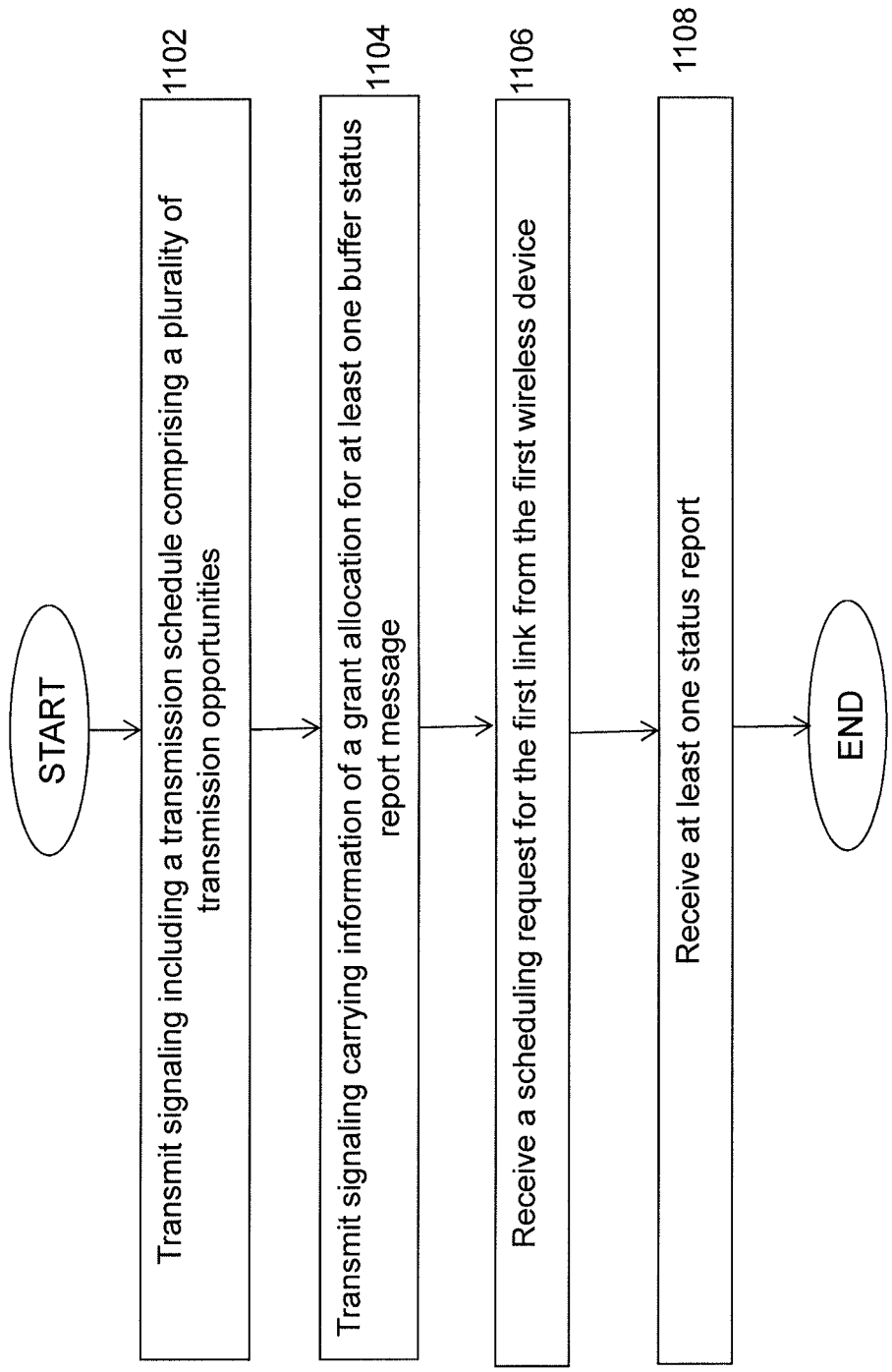
FIG. 11 is a flow chart illustrating an exemplary method for splitting D2D and cellular scheduling requests by a network node, according to a particular embodiment.

FIG. 11 is a flow chart illustrating an exemplary method for splitting D2D and cellular scheduling requests by a network node, according to a particular embodiment.

The method begins at step 1102 with transmission of signaling including a transmission schedule. In certain embodiments, the transmission schedule may include a first plurality of transmission opportunities for scheduling requests allocated to a first link. The transmission schedule may also include a second plurality of transmission opportunities for scheduling requests allocated to a second link. In a particular embodiment, for example, the first link may include a D2D link 150 between a first wireless device 110A and a second wireless device 110B. The second link may be a cellular link 140A between the first wireless device 110A and network node 115A.

At step 1104, network node 115A transmits signaling including a grant allocation for at least one buffer status report message. In a particular embodiment, the grant allocation may include information that includes a first number of buffer status report messages to be transmitted for the first link after a transmission of a scheduling request for the first link. The grant allocation may also include a second number of buffer status report messages to be transmitted for the second link after a transmission of a scheduling request for the first link.

At step 1106, network node 115A may receive a scheduling request from wireless device 110A-D during a transmission opportunity. In a particular embodiment, the transmission opportunity may include a selected one of the transmission opportunities with the first plurality of transmission opportunities. For example, the transmission opportunity might include a transmission opportunity allocated to D2D scheduling requests. Alternatively, the transmission opportunity might include a transmission opportunity allocated to cellular scheduling requests. Receipt of the scheduling request during a transmission opportunity allocated to a D2D scheduling requests may indicate to the network node 115A that wireless device 110A-D has a preference for sending a D2D communication. Likewise, receipt of the scheduling request during a transmission opportunity allocated to a cellular scheduling requests may indicate to the network node 115A that wireless device 110A-D has a preference for sending a cellular communication.

At step 1108, network node 115A may receive at least one buffer status report from wireless device 110A-D. Where, for example, the grant allocation is valid for a first number of buffer status report messages to be transmitted on the first link and a second number of buffer status report messages to be transmitted on the second link, network node 115A may receive as many as but no more the first number of buffer status report messages and the second number of buffer status report messages.

Figure 12:
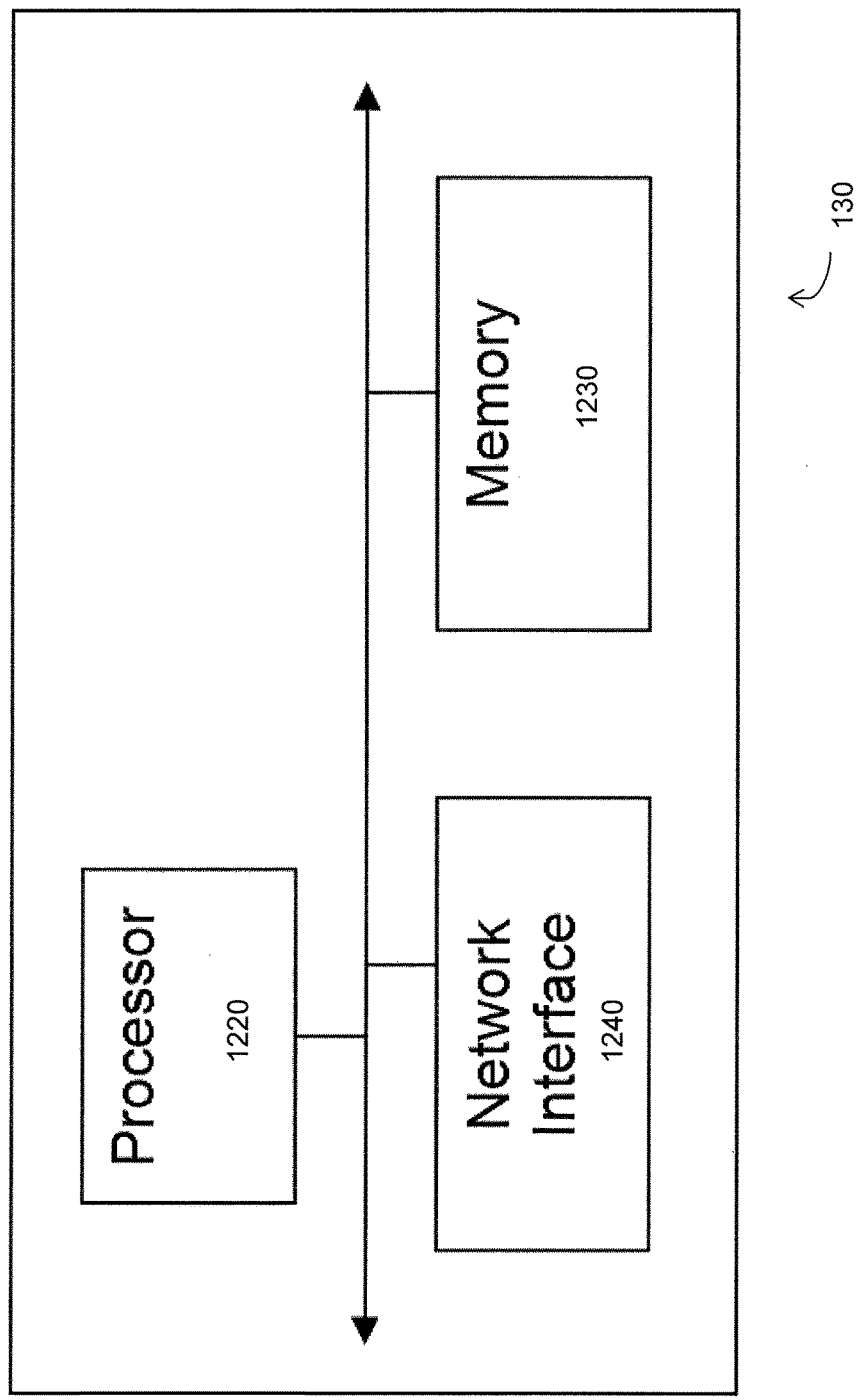
FIG. 12 is a block diagram illustrating an exemplary controller node, according to a particular embodiment.

FIG. 12 is a block diagram illustrating a core network node 130. Examples of core network node 130 can include a mobile switching center (MSC), a serving GPRS support node (SGSN), a mobility management entity (MME), a radio network controller (RNC), a base station controller (BSC), and so on. Core network node 130 includes processor 1220, memory 1230, and network interface 1240. In some embodiments, processor 1220 executes instructions to provide some or all of the functionality described above as being provided by core network node 130, memory 1230 stores the instructions executed by processor 1220, and network interface 1240 communicates signals to an suitable node, such as a gateway, switch, router, Internet, Public Switched Telephone Network (PSTN), radio network nodes 115, other core network nodes 130, etc.

Processor 1220 includes any suitable combination of hardware and software implemented in one or more modules to execute instructions and manipulate data to perform some or all of the described functions of core network node 130. In some embodiments, processor 1220 includes, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for core network node 130, send output from core network node 130, perform suitable processing of the input or output or both, communicate to other devices, or any combination of the preceding. Network interface 1240 includes appropriate hardware (e.g., port, modem, network interface card, etc.) and software, including protocol conversion and data processing capabilities, to communicate through a network.

Other embodiments of core network node 130 include additional components (beyond those shown in FIG. 12) responsible for providing certain aspects of the core network node's functionality, including any of the functionality described above and/or any additional functionality (including any functionality necessary to support the solution described above).

Some embodiments of the disclosure may provide one or more technical advantages. For example, certain embodiments may enable resource allocation for wireless devices that include priority queues for both cellular transmissions and D2D transmissions. One advantage may be that a network node may schedule transmission opportunities to the wireless device. Specifically, the network node may divide the transmission opportunities between cellular transmissions and D2D transmissions. As a result, an SR received from a wireless device during a transmission opportunity allocated for D2D communication may indicate to the network node that the wireless device has a preference to execute the data transmission via a D2D link. Likewise, a buffer status report (BSR) that is transmitted during a D2D transmission opportunity may be recognized by the network node as including the buffer status of priority queues for D2D data. As a result, the network node may be able to differentiate between the D2D SR and a "non-D2D" SR.

Such differentiation may help improve scheduling when a wireless device has both D2D traffic and non-D2D uplink traffic for transmission.

Another technical advantage may be that other uplink resources (both control channel elements (CCEs) and data channel PRBs) assigned by the network node may also be split in a time domain and/or the frequency domain. The assignment may be performed in a static way. Alternatively, the assignment may change dynamically based on the system resource utilization efficiency. Some UL control channel resources (i.e., CCEs and others) may be reused for the purpose of the D2D link transmission. Additionally or alternatively, the downlink resources may be used for the D2D link transmission if there is little data transmission in the downlink.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for allocating resources for device-to-device communications in a wireless communications network, the method comprising:
   receiving signaling, by a first wireless device, of a transmission schedule, the transmission schedule comprising:
      a first plurality of transmission opportunities for scheduling requests allocated to a device-to-device link; and
      a second plurality of transmission opportunities for scheduling requests allocated to a cellular link; and
   during a transmission opportunity within the first plurality transmission opportunities or the second plurality of transmission opportunities, transmitting a first scheduling request;
   receiving, by the first wireless device, signaling from a network node, the signaling comprising a grant allocation carrying information identifying that a plurality of status report messages are permitted to be transmitted by the wireless device, the information comprising:
      an indication of a first number of device-to-device buffer status reports (BSRs) permitted to be transmitted by the wireless device; and
      an indication of a second number of cellular BSRs permitted to be transmitted by the wireless device; and
   transmitting, by the first wireless device, the plurality of status report messages, each of the plurality of status report messages comprising:
      a device-to-device BSR indicating an amount of data to be transmitted on the device-to-device link; or
      a cellular BSR indicating an amount of data to be transmitted on the cellular link.

2. The method of claim 1,
wherein the first scheduling request is transmitted during a transmission opportunity of the first plurality of transmission opportunities to indicate to the network node that the first wireless device has a preference to transmit one or more data packets by the device-to-device link.

3. The method of claim 1, further comprising:
   transmitting, by the first wireless device, a second scheduling request for the cellular link, the second scheduling request transmitted to the network node during a transmission opportunity of the second plurality of transmission opportunities, and
   wherein transmission of the second scheduling request during the transmission opportunity of the second plurality of transmission opportunities indicates to the network node that the first wireless device has a preference to transmit one or more data packets by the cellular link.

4. The method of claim 1, wherein:
   the device-to-device link comprises a radio link between the first wireless device and a second wireless device; and
   the cellular link comprises a radio link between the first wireless device and the network node.

5. The method of claim 1, wherein the signaling from the network node is received from a broadcast signaling message or from a dedicated signaling message.

6. The method of claim 1, wherein the plurality of status report messages comprises a first plurality of device-to-device BSRs and a second plurality of cellular BSRs.

7. The method of claim 1, wherein the plurality of status report messages are transmitted during a predetermined time interval between the transmission opportunity in which the first scheduling request was transmitted and a subsequent transmission opportunity for a scheduling request.

8. The method of claim 1, wherein transmitting the plurality of status report messages comprises:
   transmitting the first number of device-to-device BSRs during the transmission opportunity; and
   transmitting the second number of cellular BSRs during the transmission opportunity.

9. A wireless device for providing IP address translation services, the wireless device comprising:
   a memory storing instructions; and
   one or more processors in communication with the memory, the one or more processors operable to execute the instructions to cause the one or more processors to:
   receive signaling of a transmission schedule, the transmission schedule comprising:
      a first plurality of transmission opportunities allocated to a device-to-device link; and
      a second plurality of transmission opportunities allocated to a cellular link; and during a transmission opportunity within the first plurality of transmission opportunities or the second plurality of transmission opportunities, transmit a first scheduling request;
receive signaling from a network node, the signaling comprising a grant allocation carrying information identifying that a plurality status report messages are permitted to be transmitted by the wireless device, the information comprising:
an indication of a first number of device-to-device buffer status reports (BSRs) permitted to be transmitted by the wireless device; and
an indication of a second number of cellular BSRs permitted to be transmitted by the wireless device; and
transmitting the plurality of status report messages, each of the plurality of status report messages comprising:
a device-to-device BSR indicating an amount of data to be transmitted on the device-to-device link; and
a cellular BSR indicating an amount of data to be transmitted on the cellular link.

10. The wireless device of claim 9, wherein the first scheduling request is transmitted during a transmission opportunity of the first plurality of transmission opportunities to indicate to the network node that the first wireless device has a preference to transmit one or more data packets by the device-to-device link.

11. The wireless device of claim 9, wherein the one or more processors are further operable to execute the instructions to cause the one or more processors to:
transmit a second scheduling request for the cellular link, the second scheduling request transmitted to the network node during a transmission opportunity of the second plurality of transmission opportunities, and
wherein transmission of the second scheduling request during the transmission opportunity of the second plurality of transmission opportunities indicates to the network node that the first wireless device has a preference to transmit one or more data packets by the cellular link.

12. The wireless device of any one of claim 9, wherein:
the device-to-device link comprises a radio link between the first wireless device and a second wireless device; and
the cellular link comprises a radio link between the first wireless device and the network node.

13. The wireless device of claim 9, wherein the signaling from the network node is received from a broadcast signaling message or from a dedicated signaling message.

14. A method for allocating resources for device-to-device communications in a wireless communications network, the method comprising:
transmitting signaling, by a network node, of a transmission schedule, the transmission schedule comprising:
a first plurality of transmission opportunities for scheduling requests allocated to a device-to-device link; and
a second plurality of transmission opportunities for scheduling requests allocated to a cellular link;
during a transmission opportunity within the first plurality of transmission opportunities or the second plurality of transmission opportunities, receiving a first scheduling request;
in response to the scheduling request, transmitting, to a first wireless device, signaling comprising a grant allocation carrying information identifying that a plurality of status report messages are permitted to be transmitted by the wireless device, wherein the information identifying that the plurality of status report messages may be transmitted by the wireless device in response to the scheduling request comprises:
an indication of a first number of device-to-device buffer status reports (BSRs) permitted to be transmitted by the wireless device; and
an indication of a second number of cellular BSRs permitted to be transmitted by the wireless device; and
receiving, from the first wireless device, the plurality of status report messages, each of the plurality of status report messages comprising:
a device-to-device BSR indicating an amount of data to be transmitted on the device-to-device link; or
a cellular buffer BSR indicating an amount of data to be transmitted on the cellular link.

15. The method of claim 14, further comprising:
determining based on the transmission of the first scheduling request during the transmission opportunity of the first plurality of transmission opportunities that the first wireless device has a preference for transmitting one or more data packets by the device-to-device link.

16. The method of claim 14, further comprising:
receiving, from the first wireless device, a second scheduling request for the cellular link, the second scheduling request transmitted to the network node during a transmission opportunity of the second plurality of transmission opportunities, and
determining based on the transmission of the second scheduling request during the transmission opportunity of the second plurality of transmission opportunities that the first wireless device has a preference to transmit one or more data packets by the cellular link.

17. The method of claim 14, wherein:
the device-to-device link comprises a radio link between the first wireless device and a second wireless device; and
the cellular link comprises a radio link between the first wireless device and the network node.

18. The method of claim 14, wherein the signaling is transmitted as a broadcast signaling message or a dedicated signaling message.

19. The method of claim 14, wherein receiving the plurality of status report messages comprises:
receiving the first number of device-to-device BSRs during the transmission opportunity; and
receiving the second number of cellular BSRs during the transmission opportunity.

20. A network node for providing IP address translation services, the network node comprising:
a memory storing instructions; and
one or more processors in communication with the memory, the one or more processors operable to execute the instructions to cause the one or more processors to:
transmit signaling of a transmission schedule, the transmission schedule comprising:
a first plurality of transmission opportunities for scheduling requests allocated to a device-to-device link; and
a second plurality of transmission opportunities for scheduling requests allocated to a cellular link;
during a transmission opportunity associated with the first plurality of transmission opportunities or the second plurality of transmission opportunities, receive a first scheduling request;

transmit, to a first wireless device, signaling comprising a grant allocation carrying information identifying that a plurality of status report messages are permitted to be transmitted by the first wireless device, wherein the information identifying that the plurality of status report messages may be transmitted by the wireless device in response to the scheduling request comprises:
- an indication of a first number of device-to-device buffer status reports (BSRs) permitted to be transmitted by the wireless device; and
- an indication of a second number of cellular BSRs permitted to be transmitted by the wireless device; and receive, from the first wireless device, the plurality of buffer status report messages, each buffer status report message comprising:
- a device-to-device BSR indicating an amount of data to be transmitted on the device-to-device link; or
- a cellular BSR indicating an amount of data to be transmitted on the cellular link.

21. The network node of claim 20, wherein the one or more processors are further operable to execute the instructions to cause the one or more processors to:
determine based on the transmission of the first scheduling request during the transmission opportunity of the first plurality of transmission opportunities that the first wireless device has a preference for transmitting one or more data packets by the device-to-device link.

22. The network node of claim 20, wherein the one or more processors are further operable to execute the instructions to cause the one or more processors to:
receive, from the first wireless device, a second scheduling request for the cellular link, the second scheduling request transmitted to the network node during a transmission opportunity of the second plurality of transmission opportunities, and
determine based on the transmission of the second scheduling request during the transmission opportunity of the second plurality of transmission opportunities that the first wireless device has a preference to transmit one or more data packets by the cellular link.

23. The network node claim 20, wherein:
the device-to-device link comprises a radio link between the first wireless device and a second wireless device; and
the cellular link comprises a radio link between the first wireless device and the network node.

24. The network node of claim 20, wherein the signaling is transmitted as a broadcast signaling message or a dedicated signaling message.

* * * * *